United States Patent [19]

Ikeda

[11] Patent Number: 5,050,150
[45] Date of Patent: Sep. 17, 1991

[54] INFORMATION DISC APPARATUS

[75] Inventor: Hietoshi Ikeda, Kanagawa, Japan

[73] Assignee: Kabushiki Kaisha Toshiba, Kanagawa, Japan

[21] Appl. No.: 589,017

[22] Filed: Sep. 27, 1990

[30] Foreign Application Priority Data

Sep. 29, 1989 [JP] Japan .................................. 1-254880

[51] Int. Cl.$^5$ .............................................. G11B 7/00
[52] U.S. Cl. .................................... 369/44.27; 369/58
[58] Field of Search ................. 369/44.27, 32, 50, 53, 369/54, 55, 56, 57, 58, 43, 44.11, 44.26; 360/31, 25

[56] References Cited

U.S. PATENT DOCUMENTS

| 4,641,294 | 2/1987 | Yoshimaru | 369/50 |
| 4,907,214 | 3/1990 | Nagano et al. | 369/32 |
| 4,918,676 | 4/1990 | Miyasaka | 369/32 |
| 4,972,399 | 11/1990 | Miyasaka | 369/44.27 |

Primary Examiner—Roy N. Envall, Jr.
Assistant Examiner—Thai Tran
Attorney, Agent, or Firm—Finnegan, Henderson, Farabow, Garrett, and Dunner

[57] ABSTRACT

An apparatus for reading and reproducing information on and from an optical disc in accordance with data in a form of bar codes representative of characteristics of the optical disc, the data having at least two pre-recorded sectors separated from each other by a non-record intersector gap therebetween in a specific area on the optical disc, the pre-recorded sector having recorded segments spaced by a non-record inter-segment gap shorter than the inter-sector gap. The apparatus includes an optical head for optically reproducing the information from the optical disc, a motor for placing the optical head on the specific area of the optical disc, a circuit for converting the information reproduced by the optical head into a binary data, a first counter for measuring the segment of the pre-recorded sector based on the binary data from the converting circuit, a second counter for measuring the inter-segment gap based on the binary data from the converting circuit with a limited capacity not sufficient to measure the intersector gas and a processor for processing the data based on results of measurements obtained by the first and second counters.

10 Claims, 7 Drawing Sheets

INFORMATION DISC APPARATUS

FIELD OF THE INVENTION

The present invention relates generally to an information disc apparatus, and more particularly, to an information disc apparatus for reading and reproducing information on and from a recording medium such as an optical disc in accordance with data representative of characteristics of the recording medium.

BACKGROUND OF THE INVENTION

As is well known, many information disc apparatus for recording or reproducing optical information on or from an optical information disc, using a laser light which is generated from a semiconductor laser, have been developed.

In the optical information discs make for use in the many information disc apparatus available there is a standard provided in relation to preformat data. These data are pre-recorded by the disc manufacturer onto the disc to indicate various information such as characteristics associated with the disc.

Referring to FIG. 1, according to the standard the preformat data are recorded on an information disc 1 at a specific area 1b separated inwardly from a data area 1a which is provided for disc users to record or read optical information on or from the information disc 1. The area 1b of the preformat data is referred to an address area. Furthermore, the preformat data are recorded in the form of bar codes. One segment of the bar code comprises a plurality of pit trains which are arranged parallel in the range 29.0 to 29.3 cm from the center of the optical information disc 1 (see FIG. 2).

Typically, three sectors of the bar codes are allocated within a circle of the address area. Two neighboring sectors of the bar codes are separated from each other by a relatively long gap. Here the gap between the sectors of the bar codes will be referred to as an inter-sector gap. However, each segment of the bar code is also separated from the others in the same sector of the bar code by a relatively long gap. Here the gap between the segments of the bar code will be referred to as an inter-segment gap.

The inter-sector gap is usually designed to be longer than the inter-segment gap. However, both the inter-sector and inter-segment gaps are extremely large in comparison to gaps between pits in the pit trains. In other words, there is not much to choose between the inter-sector and inter-segment gaps when compared to the gap between the pits. Here the gap between the pits will be referred to as an inter-pit gap.

Thus, it was very difficult to distinguish between the inter-sector and inter-segment gaps. This frequently causes the conventional information disc apparatus to fail to properly read the sectors of the bar codes.

SUMMARY OF THE INVENTION

It is, therefore, an object of the present invention to provide an information disc apparatus which is able to securely read out the preformat data in the form of bar codes from an address area of an information disc.

Another object of the present invention is to provide an information disc apparatus which is able to accurately distinguish between the inter-sector gap and the inter-segment gap of the bar codes.

In order to achieve the above object, an apparatus for reading and reproducing information on and from an optical disc in accordance with data in the form of a bar code representative of characteristics of the optical disc, the bar code data having at least two pre-recorded sectors separated with each other by a non-record inter-sector gap therebetween in a specific area on the optical disc and the pre-recorded sector having recorded segments spaced by a non-record inter-segment gap shorter than the inter-sector gap according to one aspect of the present invention, includes an optical head for optically reproducing the information from the optical disc, a motor for placing the optical head on the specific area of the optical disc, a circuit for converting the information reproduced by the optical head into a binary data, a first counter for measuring the segment of the pre-recorded sector based on the binary data from the converting circuit, a second counter for measuring the inter-segment gap based on the binary data from the converting circuit with a limited capacity for not sufficient to measuring the inter-sector gap and a processor for processing the data based on both results of measurements obtained by the first and second counters.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
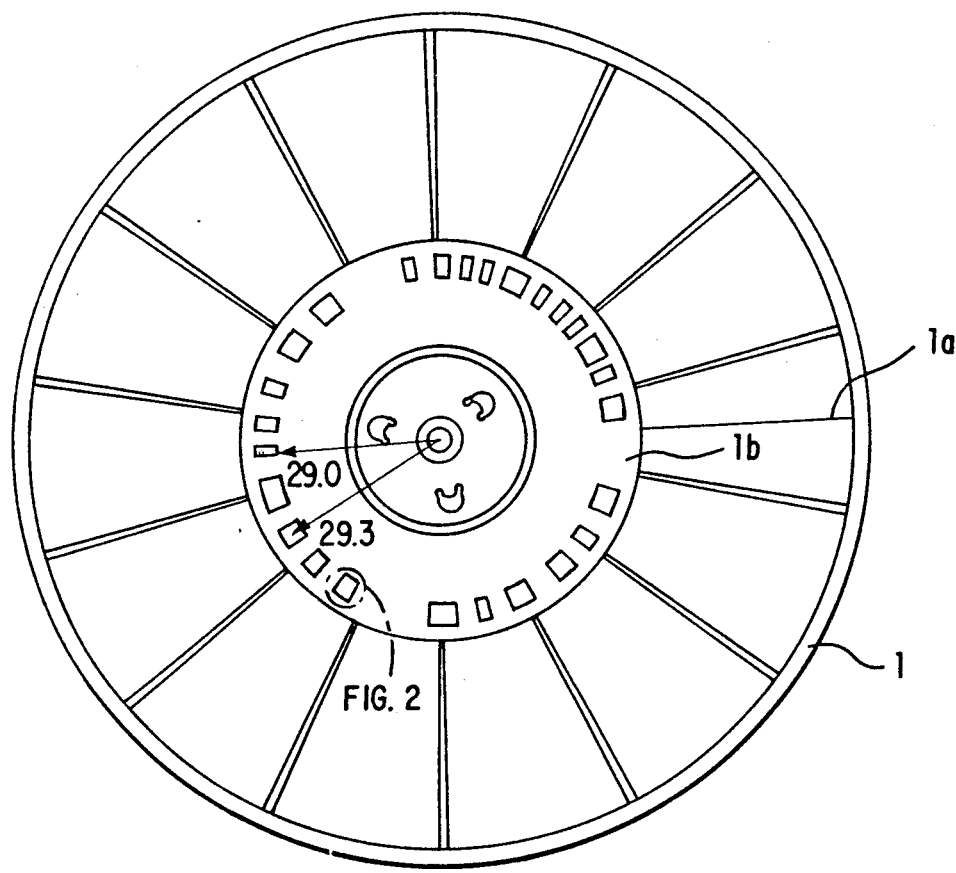
FIG. 1 is a plan view illustrating an optical information disc with which one embodiment of this invention may be used.
Figure 2:
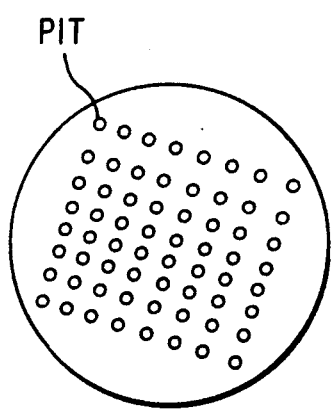
FIG. 2 is a partial enlargement of FIG. 1, in relation to a segment of the bar code pre-recorded on the optical information disc.

The present invention will be described in detail with reference to the FIGS. 1 through 10. Throughout the drawings, like or equivalent reference numerals or letters will be used to designate like or equivalent elements for simplicity of explanation.

Figure 3:
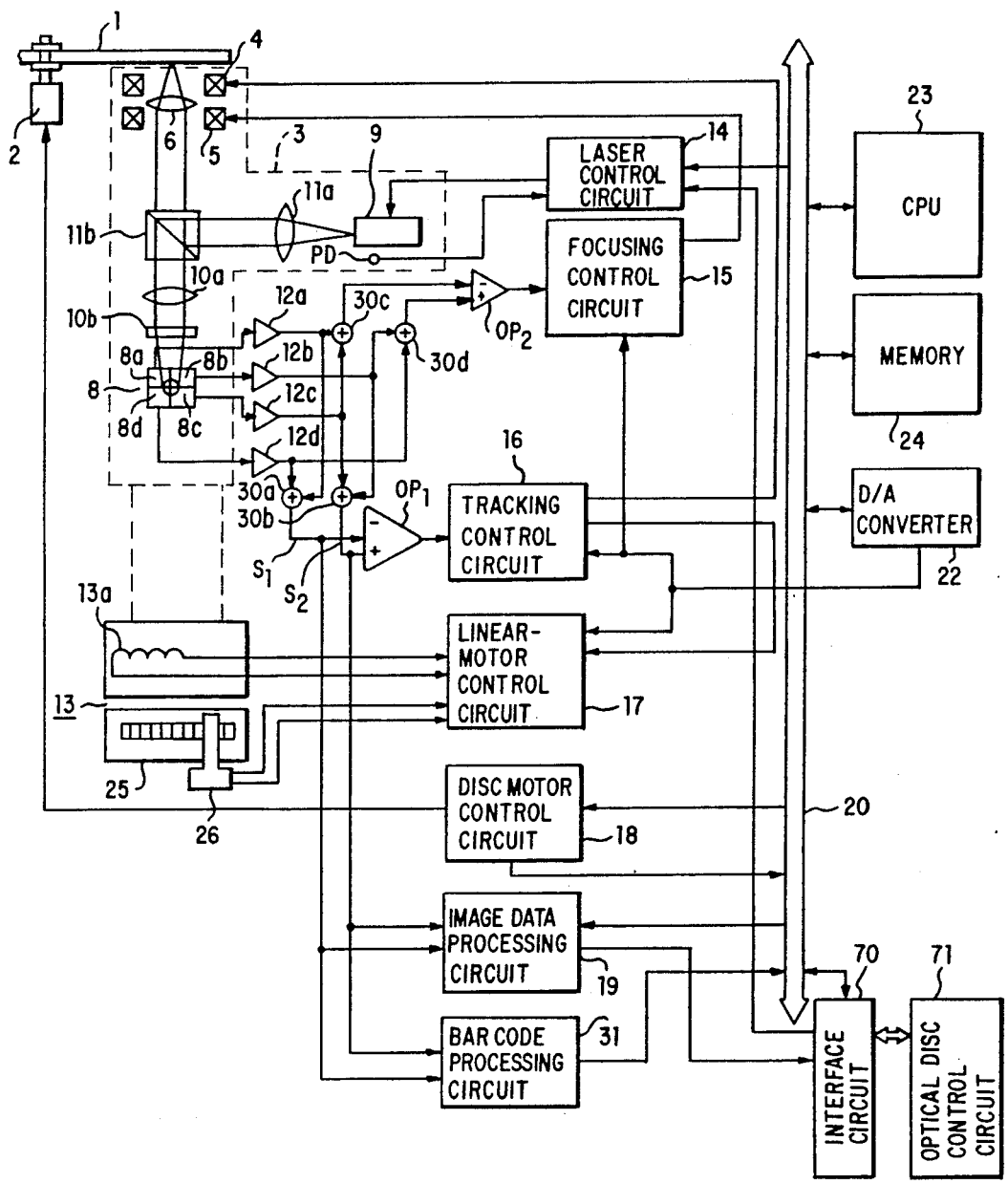
FIG. 3 is a block diagram illustrating an overall system of the information disc apparatus according to the present invention.

Referring now to FIG. 3, an embodiment of the information disc apparatus according to the present invention will be described in detail. FIG. 3 shows a block diagram illustrating an overall system of the information disc apparatus.

In FIG. 3, information recording tracks are formed with substantially equal distance between them on the surface of an optical information disc 1 in a spiral fashion or in a concentric fashion. The optical information disc 1 is rotated at a prescribed constant speed by an electric motor 2. The rotation of motor 2 is controlled by a motor control circuit 18.

Referring back to FIG. 1, the optical information disc 1 is made by coating a recording layer, such as a metalic layer of tellurium or bismuth on a glass of plastic substrate. The recording layer has a notch as a reference mark for providing a reference point in the circular direction of the optical information disc 1. The notch or the reference mark is formed at the inside edge of the recording layer near to the center of the optical information disc 1.

As described above, the optical information disc 1 has an address area 1b and a data area 1a. The address area 1b comprises the preformat data in the form of the bar codes. Typically, three sectors of the same bar codes are allocated within one circle of the address area. Each of the bar codes represents much information, such as a reflectance of the metalic recording layer, rated powers of the light beams for recording and reading operations, a data format, etc.

Figure 4:
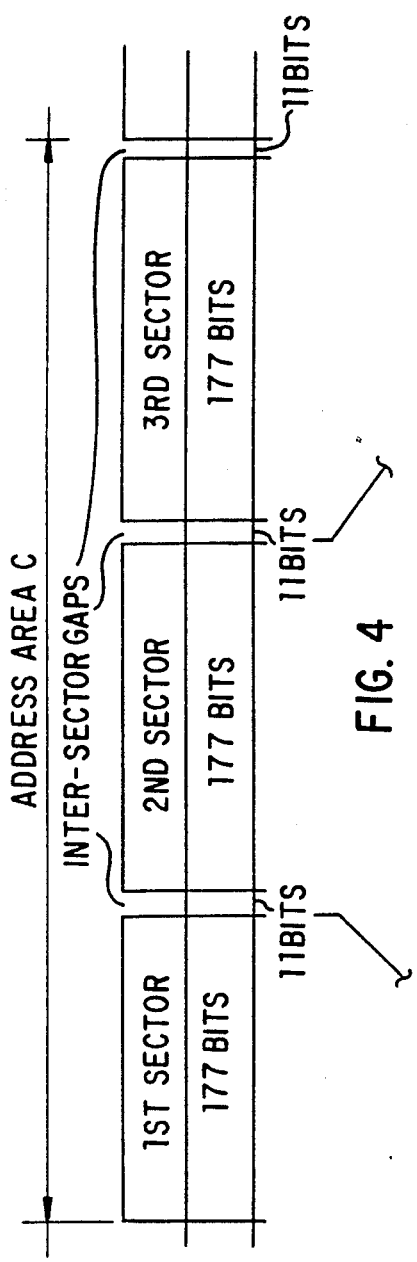
FIG. 4 is a diagram showing the bit construction of the address area 1b of FIG. 1.
Figure 5:
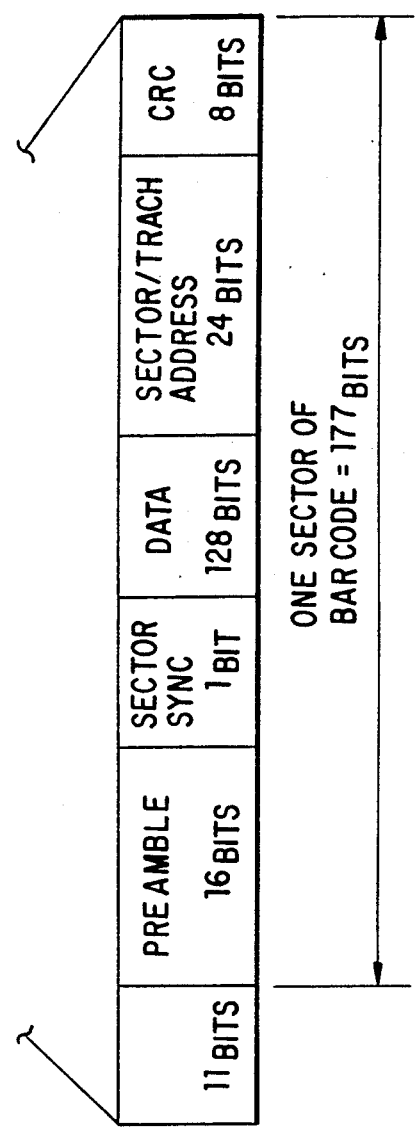
FIG. 5 is a diagram showing a partial enlargement of FIG. 4.

Referring now to FIGS. 4 and 5, bit construction of the address area 1b will be described. FIG. 4 diagrammatically shows the open form of the address area 1b.

FIG. 5 shows a partial enlargement of FIG. 4, in relation to the one sector of the bar code. As shown in FIG. 4, the address area 1b includes three sectors of the bar codes. Each sector has a length of 177 bits. The three sectors are separated from each other by the intersector gaps having a length of 11 bits. Each sector of the bar code includes, in turn, a preamble part with 16 bits length, a sector sync, signal part with one bit length, a data part with 128 bits length, a sector/track address data part with 24 bits length and a CRC (Cyclic Redundancy Check) data part with 8 bits length.

Figure 6:
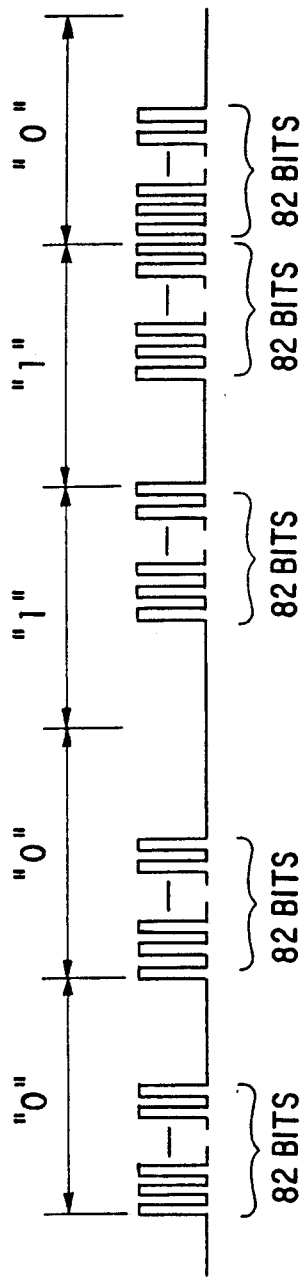
FIG. 6 is a diagram illustrating logical values of the data parts.

Referring now to FIG. 6, representations of logical values by the data bits constituting each of the data parts will be briefly explained. FIG. 6 exemplarily shows a 5 bit train. As shown in FIG. 6, when 82 continuous pits occur in the front of a data bit, the data bit is determined as the logical value of "0". When the 82 continuous pits occur in the rear of a data bit, the data bit is determined as the logical value of "1". Thus, the first, second and fifth data bits of FIG. 6 are "0". The third and fourth data bits of FIG. 6 are "1".

Figure 7:
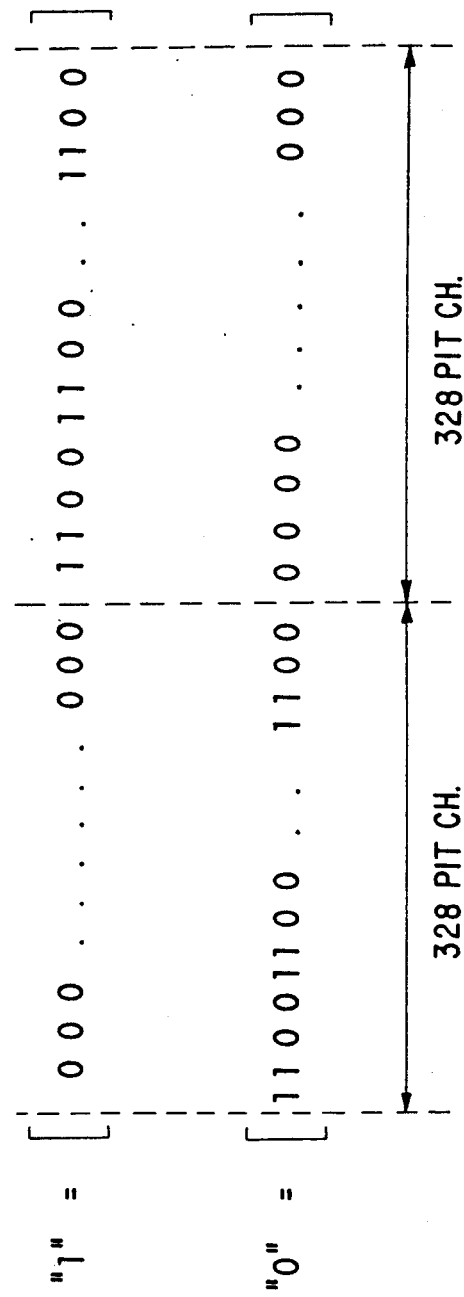
FIG. 7 is a diagram illustrating another example of logical values of the data parts.

The logical values of the data bit can be defined another way. FIG. 7 illustrates the other example of representations of logical values by the data bits. As shown in FIG. 7, when any pit train consisting of two or more continuous pits occurs in the front 328 pit channel, the data bit is determined as the logical value of "0". While, such a pit train occurs in the rear 328 pit channel, the data bit is determined as the logical value of "1".

Referring again to FIG. 1, the data area 1a is partitioned into plural sectors in the circumferential direction of the optical information disc 1 on the basis of the reference mark. On the other hand, 36,000 tracks are formed in the data area 1a so that 300,000 blocks are provided in the data area 1a.

Referring back to FIG. 3, an optical head 3 serves to record information on the optical information disc 1, and to reproduce recorded information therefrom. The optical head 3 is fixed to a moving coil 13a that constitutes a movable unit of a linear motor 13. The moving coil 13a is connected to a linear motor control circuit 17. A linear motor position detector 26 is connected to the linear motor control circuit 17. The position detector 26 detects an optical scale 25 provided on the optical head 3 so as to produce a signal indicative of the present position of the optical head 3. A permanent magnet (not shown) is provided in the stationary unit of the linear motor 13. Thus, when the moving coil 13a is energized by the linear motor control circuit 17, the optical head 3 moves in the radial direction of the optical information disc 1.

The optical head 3 comprises an objective lens 6 which is movably supported by wires or leaf springs. The objective lens 6 is moved by a focusing actuator coil 5 in a focusing direction (the optical axis direction of lens 6). Further, the objective lens 6 is moved by a tracking actuator coil 4 in a direction that intersects perpendicularly to the optical axis of lens 6. Here, an apparatus suitable to drive the objective lens 6 is not a subject of the present invention, but can be referred to any known apparatus, such as an apparatus disclosed in the Japanese Patent Application No. 61-284591. Thus, the details of the driving apparatus for the objective lens 6 will be omitted herein.

A laser diode 9 is operated in accordance with signals produced from a laser control circuit 14. Light beams emitted from the laser diode 9 are applied to the optical information disc 1 through a collimator lens 11a, a half prism 11b and the objective lens 6. Further, light beams reflected from the optical information disc 1 are fed into an optical detector 8 through the objective lens 6, the half prism 11b, a focusing lens 10a and a cylindrical lens 10b.

The optical detector 8 consists of four partitioned light detector cells 8a, 8b, 8c and 8d.

The output signals of the light detector cells 8a, 8b, 8c and 8d are respectively fed into amplifiers 12a, 12b, 12c and 12d. The output signal from the amplifier 12a is fed into one input of an adder 30a and also into one input of an adder 30c. Further, the output signal from the amplifier 12b is fed into one input of an adder 30b and also into one input of an adder 30d. The output signal of the amplifier 12c is fed into the other input of the adder 30b and also into the other input of the adder 30c. The output signal of the amplifier 12d is fed into the other input of the adder 30a and also into the other input of the adder 30d.

An output signal from the adder 30a and an output signal from the adder 30b are respectively fed into an inverting input and a non-inverting input of an operational amplifier OP1. Thus, the operational amplifier OP1 produces a tracking error signal. The tracking error signal output from the operational amplifier OP1 is fed into a tracking control circuit 16. The tracking control circuit 16 produces a tracking control signal. The tracking control signal is then applied to the tracking actuator coil 4 and the linear motor control circuit 17.

Here, assume that the optical head 3 has achieved access to the desired track by the action of the linear motor 13. The tracking control circuit 16 produces a drive signal which is supplied to the tracking actuator coil 4 provided in the optical head 3. Thus, the objective lens 6 is moved so as to precisely oppose the desired track. As a result, the light beam 11a is moved accurately to the desired track (later described in detail).

An output signal from the adder 30c is fed into an inverting input of an operational amplifier OP2. Further, an output signal from the adder 30d is fed into a non-inverting input of the operational amplifier OP2. As a result, the operational amplifier OP2 produces a focusing error signal proportional to the difference between the output signals of the adders 30c and 30d. The focusing error signal output from the operational amplifier OP2 is fed into a focusing control circuit 15. The focusing control circuit 15 produces a focusing control signal. The focusing control signal is fed into the focusing actuator coil 5. As a result, the light beam from the laser diode 9 is precisely focused on the surface of the optical information disc 1. The focusing and tracking of the objective lens 6 are performed in the above-described manner.

The output signals from the adders 30a and 30b are applied into an image data processing circuit 19 and then combined together. Thus a signal representing the sum of the respective output signals of the light detector cells through 8d is applied to the image data processing circuit 19 so as to precisely correspond to the presence of pits (i.e., recorded information) on the surface of the optical information disc 1. The image data processing circuit 19, in turn, reproduces a data signal representing both image information and address information (e.g., track number, sector number etc.).

The data signal produced in the operational amplifier OP1 is fed into an optical disc control circuit 71 as a peripheral equipment of this information disc apparatus through an interface circuit 70.

The output signals from the adders 30a and 30b are further applied into a bar code processing circuit 31 The bar code processing circuit 31 detects the bar code when the optical head 3 traces the address area 1b, as described in detail later.

The laser control circuit 14, the focusing control circuit 15, the tracking control circuit 16, the linear motor control circuit 17, the motor control circuit 18, the image data processing circuit 19 and the track counter circuit 32 are connected to a CPU (central processing sector) 23 through a bus line 20. The CPU 23 controls these circuits 14 through 19 in accordance with a prescribed program stored in a memory sector 24. Further, the focusing control circuit 15, the tracking control circuit 16, and the linear motor control circuit 17 are controlled in accordance with signals produced from a D/A (digital-to-analog) converter 22.

Figure 8:
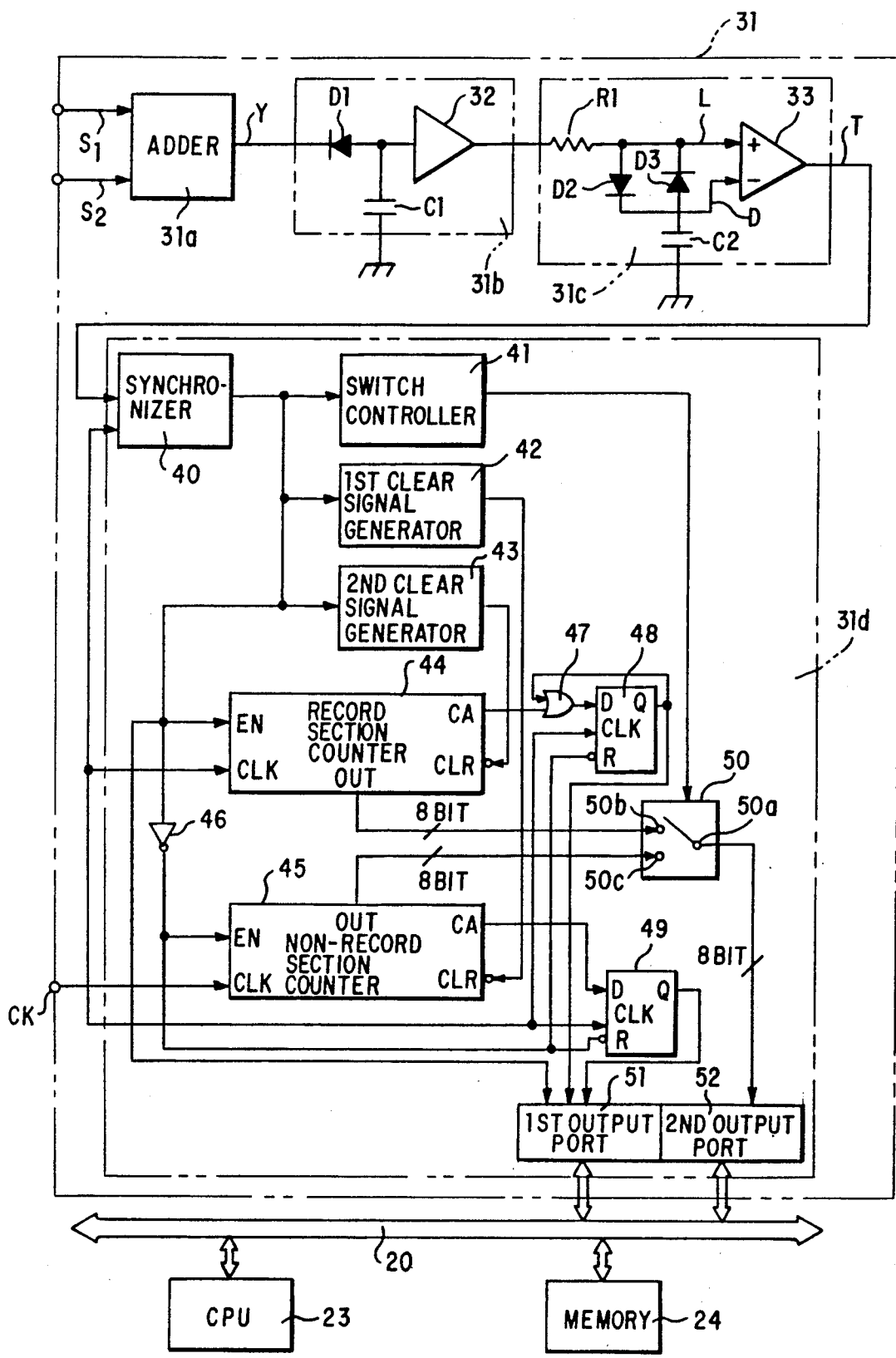
FIG. 8 is a block diagram showing the bar code processing circuit of FIG. 3.

Referring now to FIG. 8, the details of the bar code processing circuit 31 of FIG. 3 will be described in detail. FIG. 8 shows a block diagram illustrating the detail of the bar code processing circuit 31. In FIG. 8, the bar code processing circuit 31 comprises an adder 31a, lower level detector 31b, a binary encoder 31c and a time interval counter 31d. The lower level detector 31b comprises an amplifier 32 and an integrator consisting of a diode D1a and a capacitor C1 for integrating an input signal to the amplifier 32. The binary encoder 31c comprises a comparator 33 and a delay circuit consisting of two diodes D2, D3 and a capacitor C2 for delaying one input signal to the Comparator 33.

The time interval counter 31d comprises a synchronizer 40, a switch controller 41, first and second clear signal generators 42 and 43, a record section measuring counter 44, a non-record section measuring counter 45, an inverter 46, an OR gate 47, first and second flip-flops 48 and 49, a switch 50 and first and second output ports 51 and 52.

The adder 31a adds the output signals from the adders 30a and 30b (see FIG. 3). Thus, the above-mentioned signal representing the sum of the respective output signals of the light detector cells 8a through 8d is obtained by the adder 31a as a reproduced signal Y. The reproduced signal Y corresponds to reproduced information from the recorded signal or data of the optical information disc 1. The reproduced signal Y is applied to the lower level detector 31b. The lower level detector 31b detects the lower end of the reproduced signal Y, which corresponds to a dark level peak of the reproduced signal Y. The lower level detector 31b thus outputs a lower level detection signal L. The lower level detection signal L is applied to the binary encoder 31c. In the binary encoder 31c, the lower level detection signal L is directly input to the non-inverting input of the comparator 33. The lower level detection signal L is further input to the inverting input of the comparator 33 through the delay circuit. Thus, the comparator 33 compares the direct signal of the lower level detection signal L and its delayed signal D.

The comparator 33 outputs an "L" level detection signal when the delayed signal D is lower than the direct signal L. This situation corresponds to a non-recorded section. The comparator 33 outputs an "H" level detection signal when the delayed signal D is higher than the direct signal L. This situation corresponds to a recorded section. Thus, a binary signal T is obtained from the binary encoder 31c. The binary signal T is applied to the time interval counter 31d.

Figures 9A, 9B, 9C:
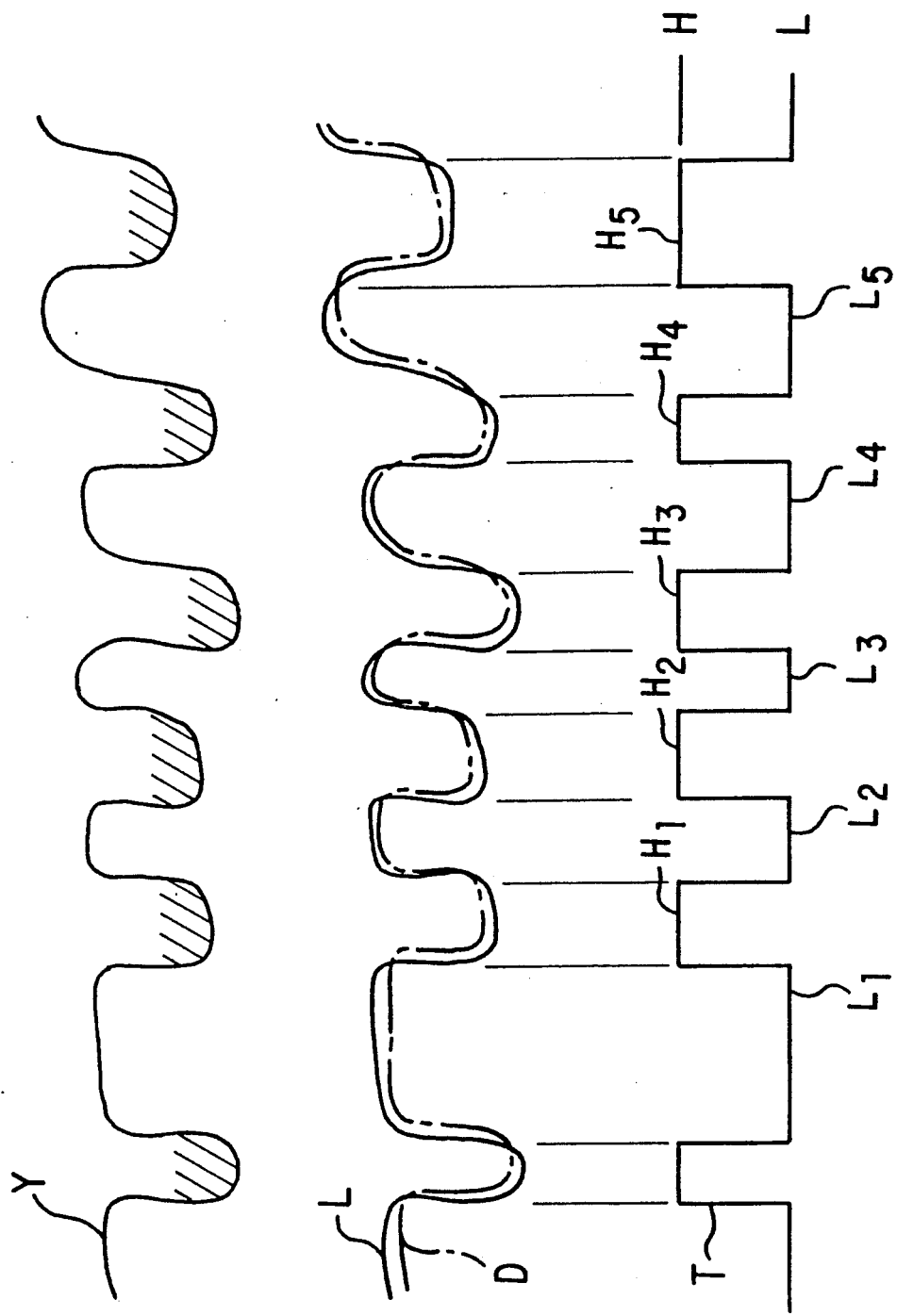
FIG. 9, consisting of A-C, is a timing diagram illustrating a signal reshaping operation.

The operation of the lower level detector 31b and the binary encoder 31c will be clarified in reference to FIG. 9. FIG. 9 shows a timing diagram of the signals relating to the circuits 31b and 31c. In FIG. 9, Graphs 9A and 9C show the reproduced signal Y and the binary signal T, respectively output from the adder 31a and the binary encoder 31c. As shown in Graph 9a, the upper and lower levels of the reproduced signal Y correspond to the light level and the dark level, i.e., the recorded section and the non-recorded section of the optical information disc 1. On the other hand, Graph 9B shows the lower level detection signal L and its delay signal D both applied to the comparator 33. The lower level detection signal L and its delay signal D are compared by the comparator 33 so that the binary signal T as shown by Graph 9C is obtained. The reproduced signal Y obtained by the adder 31a is usually rounded, in spite of the optical recorded signal on the optical information disc 1 having a complete pulse shape. However, the rounded shape of the reproduced signal Y is recovered to the binary signal T, as shown by Graph 9C, through the lower level detector 31b and the binary encoder 31c. Such a reshaping of the reproduced signal Y can also be implemented by other known techniques.

The time interval counter 31d is provided for distinguishing the inter-sector gap and the inter-segment gap of the bar codes based on the binary signal T, when the optical head 3 traces the address area 1b (see FIG. 1). In the time interval counter 31d, the synchronizer 40 synchronizes the binary signal T supplied from the binary encoder 31d with a clock pulse which is supplied from a clock input terminal CK. An output of the synchronizer 40 is applied to the switch controller 41, the first and second clear signal generators 42 and 43, the record section measuring counter 44 and the first output port 51. The Output of the synchronizer 40 is further applied to the non-record section measuring counter 45 through the inverter 46. When the synchronized signal supplied from the synchronizer 40 is in "L" level, the switch controller 41 controls the switch 50 to cause the movable contact 50a being coupled to a first fixed contact 50b. The switch controller 41 controls the switch 50 to cause the movable contact 50a being coupled to a second fixed contact 50c when the synchronized signal supplied from the synchronizer 40 is in "H" level.

The first clear signal generator 42 applies a first clear signal to the non-record section measuring counter 45, when the synchronized signal supplied from the synchronizer 40 has changed from "H" level to "L" level. The second clear signal generator 42 applies a second clear signal to the record section measuring counter 44, when the synchronized signal supplied from the synchronizer 40 has changed from "L" level to "H" level. The record section measuring counter 44 counts the clock pulses supplied from clock input terminal CK while the synchronized signal supplied from the synchronizer 40 is in "H" level. The non-record section measuring counter 45 counts the clock pulses supplied from a clock input terminal CK while the synchronized signal supplied from the inverter 46 is in "H" level. In other words, the non-record section measuring counter 45 counts the clock pulses while the synchronized Signal supplied from the synchronizer 40 is in "L" level. The counts of the record section measuring counter 44 and the non-record section measuring counter 45 are applied to the first and second fixed contacts 50b and 50c of the switch 50. As described above, the switch 50 is controlled in response to the synchronized signal. Thus, the counts of the record section measuring counter 44 and the non-record section measuring counter 45 are selectively applied to the CPU 23 through the switch 50, the second output port 52 and the bus line 20.

Both the record section measuring counter 44 and the non-record section measuring counter 45 are designed to have capacities large enough to count the segment lengths and the inter-segment lengths of the bar codes. However, both this capacities are limited to be not excessively large. Thus, the record section measuring counter 44 overflows and outputs a first carry signal when the optical heads 3 encounters a relatively large piece of dirt or dust. The non-record section measuring counter 45 overflows and outputs a second carry signal when the optical heads 3 traces the inter-sectors which are sufficiently longer than the inter-segments of the bar codes.

The first carry signal output from the record section measuring counter 44 is applied to the first flip-flop 48 through the OR gate 47. The output of the first flip-flop 48 is then applied to the first output port 51. The second carry signal output from the non-record section measuring counter 45 is applied to the second flip-flop 49. The output of the second flip-flop 49 is then applied to the first output port 51.

The second output port 52 transmits the count of the record section measuring counter 44 from the switch 50 to the CPU 23 through the bus line 20 when the synchronized signal supplied from the synchronizer 40 has changed from "H" level to "L" level. Also, the second output port 52 transmits the count of the non-record section measuring counter 45 from the switch 50 to the CPU 23 through the bus line 20 when the synchronized signal supplied from the synchronizer 40 has changed from "L" level to "H" level.

Figure 10:
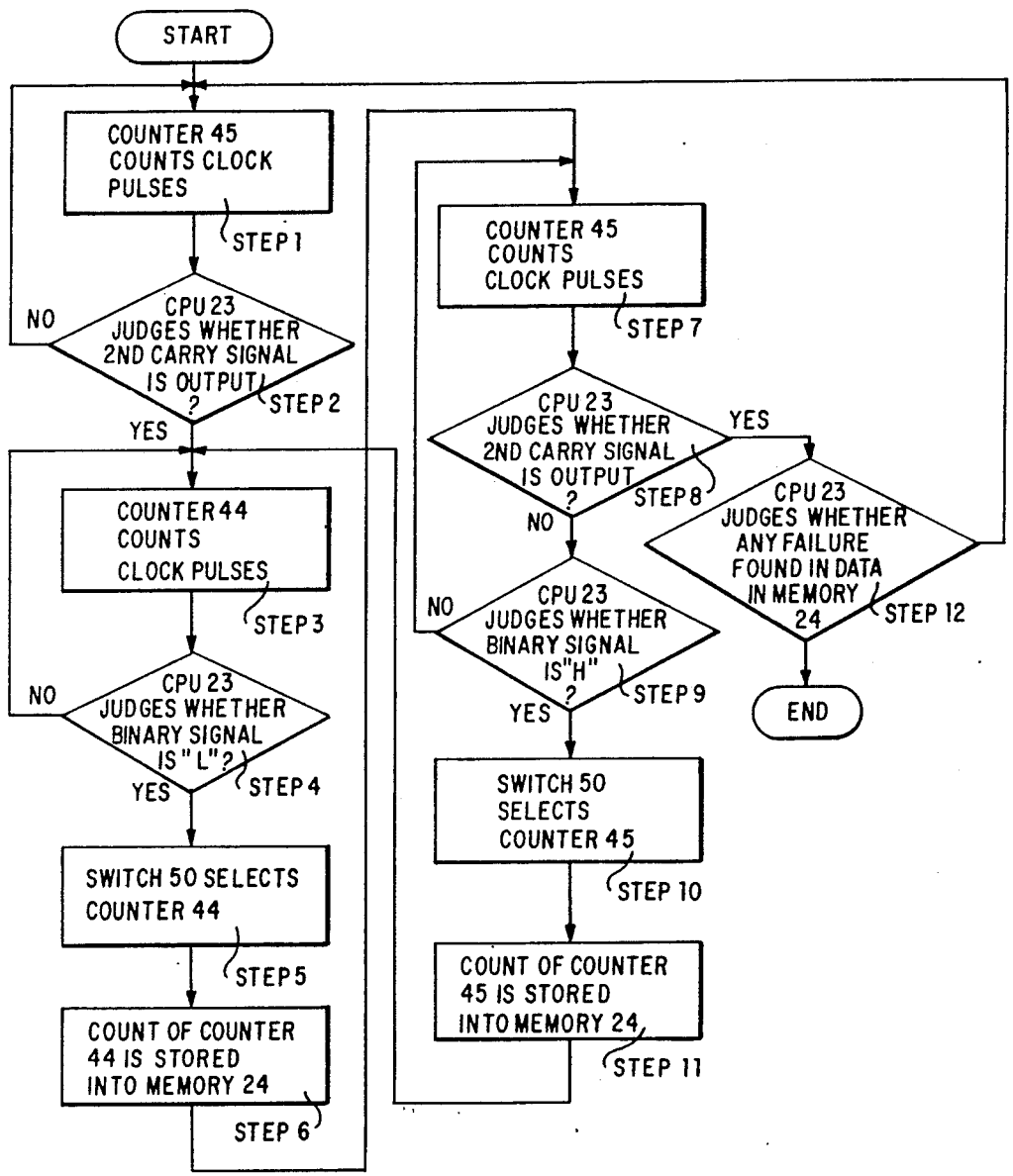
FIG. 10 is a flowchart explaining the operation of the bar code processing circuit of FIG. 8.

Referring now to FIG. 10, the operation of the bar code processing circuit 31 will be described. FIG. 10 shows a flowchart of the operation. In FIG. 10, the "START" step designates an operation carried out at the start of the operation of the information disc apparatus. At the "START" step, the optical disc control circuit 71 supplies the CPU 23 with a command for accessing the address area 1b through the interface circuit 70 and the bus line 20 (see FIG. 3). The CFU 23 indicates the linear motor control circuit 17 to place the optical head 3 on the address area 1b of the optical information disc 1. The CPU 23 then indicates the laser control circuit 14 to energize the laser diode 9. The light beam generated from the laser diode 9 is radiated to the optical information disc 1 through the collimator lens 11a, the half prism 11b and the objective lens 6. The light beams reflected from the optical information disc 1 are fed into the optical detector 8 through the objective lens 6, the half prism 11b, the focusing lens 10a and the cylindrical lens 10b. Thus, the light detector cells 8a, 8b, 8c and 8d of the optical detector 8 output electrical signals in response to respective amounts of the reflected light beam fed thereto.

The output signals of the light detector cells 8a, 8b, 8c and 8d are respectively fed into the amplifiers 12a, 12b, 12c and 12d. The output signal from the amplifier 12a is fed into the one input of the adder 30a and also into the one input of the adder 30c. Further, the output signal from the amplifier 12b is fed into the one input of the adder 30b and also into the one input of the adder 30d. The output signal of the amplifier 12c is fed into the other input of the adder 30b and also into the other input of the adder 30c. The output signal of the amplifier 12d is fed into the other input of the adder 30a and also into the other input of the adder 30d.

The outputs of the adders 30a and 30b are applied to the adder 31a in the bar code processing circuit 31. The adder 31a outputs, e.g., the reproduced signal Y which is described above in reference to FIG. 9, Graph 9A. The reproduced signal Y is then reshaped into the binary signal T by the lower level detector 31b and the binary encoder 31c. The binary signal T includes "L" level portions L1, L2, L3, . . . and "H" level portions H1, H2, H3, . . . The "L" level portions L1 corresponds to the inter-sector gap and the "L" level portions L2, L3, . . . correspond to the inter-segment gaps. The "H" level portions H1, H2, H3, . . . correspond to the segments of the bar codes.

Here it is assumed that the optical head 3 faces any one of the non-recorded sections of the address area 1b, e.g., the inter-sector gaps or the inter-segment gaps. Then, the process moves to the STEP 1 of FIG. 10.

In STEP 1, the non-record section measuring counter 45 counts the clock pulses to measure the "L" level section the optical head 3 is facing. Then the process moves to STEP 2.

In STEP 2, the CPU 23 judges whether the second carry signal is output from the non-record section measuring counter 45 or not. The second carry signal, if generated, is transmitted to the CPU 23 through the first output port 51, as described before. If the second carry signal is not found, the process of STEP 1 is repeated until the second carry signal is found. When the second carry signal has been found, the CPU 23 judges that the optical head 3 is facing the inter-sector gap, i.e., the gap between two neighboring bar codes. Then the process moves to STEP 3.

In STEP 3, the record section measuring counter 44 is cleared by the second clear signal supplied from the second clear signal generator 43, when the binary signal T has changed to "H" level. Thus, the record section measuring counter 44 starts the count of the clock pulses. The record section measuring counter 44 counts the clock pulses to measure the "H" level section H1, which corresponds to the segment the optical head 3 is then facing. Then the process moves to STEP 4.

In STEP 4, the CPU 23 judges whether the binary signal T is "H" level or "1" Level. If the present level of the binary signal T is still "H" level, the process of STEP 3 is repeated so that the count operation of the record section measuring counter 44 is continued. If the present level of the binary signal T has changed to "L" level, the process moves to STEP 5.

In STEP 5, the switch 50 is changed to connection state of the first fixed contact 50b. Thus, the count of the record section measuring counter 44 is applied to the second output port 52 through the switch 50. The count of the record section measuring counter 44 is then stored into the memory 24 through the bus line 20, as shown in STEP 6. Simultaneously the process moves to STEP 7.

In STEP 7, the non-record section measuring counter 45 is cleared by the first clear signal supplied from the first clear signal generator 45 in response to the "L" level. Thus, the non-record section measuring counter 45 starts the count of the clock pulses. The non-record section measuring counter 45 counts the clock pulses to measure the "L" level section L2, which corresponds to the first inter-segment gap the optical head 3 is facing. Then the process moves to STEP 8.

In STEP 8, the CPU 23 judges whether the second carry signal is output from the non-record section measuring counter 45 or not. If the second carry signal is not found, the process moves to STEP 9.

In STEP 9, the CPU 23 again judges whether the binary signal T is "H" level or "1" Level. If the present level of the binary signal T is still "L" level, the process of STEP 7 is repeated so that the count operation of the non-record section measuring counter 45 is continued. If the present level of the binary signal T has changed to "H" level, the process moves to STEP 10.

In STEP 10, the switch 50 is changed to the connection state of the second fixed contact 50c. Thus, the count of the non-record section measuring counter 45 is applied to the second output port 52 through the switch 50. The count of the non-record section measuring counter 45 is then stored into the memory 24 through the bus line 20, as shown in STEP 11. Simultaneously the process returns to STEP 3.

In STEP 3, the record section measuring counter 44 is again cleared by the second clear signal supplied from the second clear signal generator 43, when the binary signal T has changed to "H" level. Thus, the record section measuring counter 44 starts a measurement of another segment of the bar codes. Then, the above-mentioned STEPs 4 thorough 8 are repeated.

In STEP 8, if the second carry signal is found, it is judged that the optical head 3 now faces another inter-sector gap. Then, the CPU 23 determines that the reading operation of one set of the bar code has been completed. Thus, the process goes to STEP 12.

In STEP 12, the CPU 23 judges whether the count data in the memory 24, which have been sequentially stored by the record section measuring counter 44 and the non-record section measuring counter 45, are sufficient or not. If any failure is found in the stored data, the process returns to STEP 1. Thus, all the above-mentioned processes will be repeated if necessary. If it is judged in the CPU 23 that the stored data is satisfactory, the process goes to "END" step.

When the process of FIG. 10 is completed, the data stored in the memory 24 represents the preformat data which are pre-recorded by a disc manufacturer to indicate various information associated to the discs.

According to the present invention, the time interval counter 31d can accurately distinguish between the inter-sector gap and the inter-segment gap in relation to the bar code pre-recorded in the address area by disc manufacturers.

As described above, the present invention can provide an extremely preferable information disc apparatus.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefore, it is intended that the present invention not be limited to the particular embodiment disclosed as the best mode contemplated for carrying out the present invention, but that the present invention include all embodiments falling within the scope of the appended claims.

What is claimed is:

1. An apparatus for reading and reproducing information on and from a recording medium in accordance with data representative of characteristics of the recording medium, the data having at least two pre-recorded sectors separated from each other by a non-record inter-sector gap therebetween in a specific area on the recording medium, the pre-recorded sectors having recorded segments spaced by a non-record inter-segment gap shorter than the inter-sector gap, comprising:

means for optically reproducing the information from the recording medium;

means for placing the reproducing means on the specific area of the recording medium;

means for converting the information reproduced by the reproducing means into a binary data;

first means for measuring the segment of the pre-recorded sector based on the binary data from the converting means;

second means for measuring the inter-segment gap based on the binary data from the converting means, said second means having a limited capacity which is not sufficient to measure the inter-sector gap; and means for processing the data based on measurements obtained by the first measuring means and the second measuring means.

2. An apparatus of claim 1, wherein the second measuring means includes a counter means.

3. An apparatus of claim 2, wherein the counter means includes a first counter which produces a carry signal when its counting operation has overflowed.

4. An apparatus of claim 3, wherein the reading means is responsive to the carry signal.

5. An apparatus of claim 3, further comprising first clearing means for clearing the first counter in response to the binary data.

6. An apparatus of claim 5, wherein the first clearing means clears the first counter when the binary data has changed to a logic state corresponding to the reading of a segment.

7. An apparatus of claim 6, wherein the first measuring means includes a second counter.

8. An apparatus of claim 7, further comprising second clearing means for clearing the second counter in response to the binary data.

9. An apparatus of claim 8, wherein the second clearing means clear the second counter when the binary data has changed to a logic state corresponding to the inter-segment gaps.

10. A method for reading and reproducing information on and from a recording medium using a light beam in accordance with data representative of characteristics of the recording medium based on a light beam, the data having at least two pre-recorded sectors separated from each other by a non-record inter-sector gap therebetween in a specific area on the recording medium, the pre-recorded sector having recorded segments spaced by a non-record inter-segment gaps shorter than the inter-sector gap, comprising the steps of:

optically reproducing the information on the specific area of the recording medium;

converting the information reproduced by the reproducing step into binary data;

measuring the segment of the pre-recorded sector based on the binary data obtained by the converting step;

measuring the inter-segment gap based on the binary data obtained by the converting step using a limited capacity not sufficient to measure the inter-sector gap; and processing the data based on the results of the measuring steps.

* * * * *

UNITED STATES PATENT AND TRADEMARK OFFICE
CERTIFICATE OF CORRECTION

PATENT NO. : 5,050,150
DATED : September 17, 1991
INVENTOR(S) : Hidetoshi Ikeda

It is certified that error appears in the above-indentified patent and that said Letters Patent is hereby corrected as shown below:

Abstract, line 6, change "intersector" to --inter-sector--.

Abstract, line 19, change "intersector" to --inter-sector--.

Abstract, line 20, change "gas" to --gap--.

Signed and Sealed this

Eighth Day of June, 1993

Attest:

MICHAEL K. KIRK

Attesting Officer

Acting Commissioner of Patents and Trademarks